United States Patent [19]

Distler et al.

[11] 3,878,152

[45] Apr. 15, 1975

[54] HEAT-SENSITIZATION OF ANIONIC AND NON-IONIC AQUEOUS POLYMER DISPERSIONS

[75] Inventors: Dieter Distler, Mutterstadt; Kurt Wendel, Ludwigshafen; Andreas Einwiller, Mannheim; Knut Oppenlaender, Ludwigshafen, all of Germany

[73] Assignee: Badische Anilin- & Soda-Fabrik Aktiengesellschaft, Ludwigshafen/Rhineland, Rhineland-Pfalz, Germany

[22] Filed: May 23, 1973

[21] Appl. No.: 362,901

[52] U.S. Cl...... 260/29.6 XA; 260/29.6 TA; 260/29.6 MN; 260/29.6 RW; 260/29.7 NE; 260/739
[51] Int. Cl.......... C08c 1/14; C08d 7/16; C08f 1/92
[58] Field of Search ....... 260/3, 29.6 MN, 29.6 XA, 260/29.6 TA, 29.6 RW, 821, 78.5 R, 78.5 T, 83.3, 85.1, 29.7 R, 29.7 NE, 92.8 W, 92.8 A, 86.1 R, 85.5 S, 94.7 R, 94.9 F, 96 R

[56] References Cited
UNITED STATES PATENTS

| | | | |
|---|---|---|---|
| 2,805,210 | 9/1957 | Stoner et al. | 260/29.7 |
| 2,809,948 | 10/1957 | Hunter et al. | 260/28.5 |
| 2,912,349 | 11/1959 | Videen et al. | 117/103 |
| 3,006,872 | 10/1961 | Benedict et al. | 260/3 |
| 3,321,432 | 5/1967 | Strasser et al. | 260/29.7 |
| 3,549,579 | 12/1970 | Sinclair | 260/29.7 |
| 3,660,324 | 5/1972 | Onchi | 260/17.5 |

*Primary Examiner*—Joseph L. Schofer
*Assistant Examiner*—John Kight, III

[57] ABSTRACT

Polymer dispersions are heat-sensitized by the addition of alkoxylated amines having inverse solubility, when the pH of the mixture is below 6.

9 Claims, No Drawings

HEAT-SENSITIZATION OF ANIONIC AND NON-IONIC AQUEOUS POLYMER DISPERSIONS

This invention relates to heat-sensitization of polymer dispersions.

It is well known that polymer dispersions may be coagulated by adding sensitizing agents and heating. Natural or synthetic latices may be treated in this way and also secondary dispersions may be heat-sensitized. When heat-sensitized polymer dispersions are used, there is a reduction or complete suppression of migration of the polymer particles on drying and the removal of the aqueous phase is particularly easy after coagulation. Sensitizers used in the processes described in German Pat. No. 869,861 and German Published Application No. 1,569,119 are polyvinyl alkyl ethers, whilst they are water-soluble polyacetals in the process described in German Published Application No. 1,066,734, alkoxylated polysiloxanes in the processes described in U.K. Pat. No. 1,206,136, German Pat. No. 1,243,394 and German Published Application No. 2,005,974 and substances showing cationic activity in the processes described in German Published Application No. 1,619,049; 1,619,050 and 1,948,301. However, the prior art sensitizers are unsatisfactory in several respects. For example, substances showing cationic activity, when used as sensitizers and particularly when used for sensitizing anionic latices, generally cause considerable reduction of the stability at room temperature and thus lead to poor storage properties and also to an increase in the susceptibility of the latices to shear forces such as frequently occur during processing, for example padding. To increase the stability of latices sensitized with alkoxylated polysiloxanes it is generally necessary to add emulsifiers during storage. If polyvinyl alkyl ethers are used as sensitizers, the properties of the coagulate are often impaired, for example it may become tacky. With the use of polyether thioethers and polyacetals as sensitizers, only incomplete coagulation is possible in the case of polymer dispersions having low solids contents (less than 30 percent).

We have now found that anionic and non-ionic aqueous polymer dispersions may be advantageously heat-sensitized by the addition of polyalkylene oxides of inverse solubility, if alkoxylated amines of inverse solubility are added to the polymer dispersions and the pH of the mixture is adjusted to below 6 if not already below 6. Our novel process is suitable for the heat-sensitization of virtually all natural and synthetic, primary and secondary polymer dispersions. A particular example of a natural polymer dispersion is natural rubber latex. Suitable secondary dispersions are those of polyisobutylene or polyethylene which may have been made is conventional manner using conventional anionic and non-ionic emulsifying and dispersing agents. Suitable synthetic anionic and non-ionic aqueous primary dispersions of polymers are for example those of mono-olefins and diolefins, particularly ethylene and butadiene, of monovinylaromatic compounds, particularly styrene, vinyl toluenes, α-methylstyrene and o-chlorostyrene, of vinyl halides and/or vinylidene halides, particularly vinyl chloride and vinylidene chloride, of monoolefinically unsaturated carboxylates usually containing from 3 to 20 and in particular from 4 to 14 carbon atoms, such as vinyl esters of saturated straight-chain or branched-chain aliphatic carboxylic acids, e.g. vinyl acetate, vinyl propionate, vinyl n-butyrate, vinyl pivalate, vinyl laurate and vinyl stearate, of alkyl acrylates and alkyl methacrylates, such as methyl acrylate, methyl methacrylate, ethyl acrylate, n-butyl acrylate, n-butyl methacrylate, t-butyl acrylate, n-hexyl acrylate, n-hexyl methacrylate, 2-ethylhexyl acrylate, 2-ethylhexyl methacrylate, n-decyl acrylate and n-dodecyl methacrylate, and of dialkyl esters of $\alpha\beta$-mono-olefinically unsaturated dicarboxylic acids, such as the dimethyl, diethyl, di-n-butyl and di-n-hexyl esters of maleic acid, fumaric acid and itaconic acid, and of vinyl ethers such as vinyl ethyl ether, vinyl methyl ether, vinyl n-butyl ether and vinyl s-butyl ether. The aqueous polymer dispersions of the above kinds may contain polymerized units of one or more of said monomers. Of particular interest are for example the usual aqueous dispersions of ethylene/vinyl acetate copolymers, copolymers of butadiene, styrene and/or acrylonitrile, acrylate copolymers, acrylate/styrene copolymers, vinyl chloride/acrylate copolymers, vinylidene chloride/acrylate copolymers, vinyl chloride/vinylidene chloride copolymers and vinylidene chloride/acrylonitrile copolymers.

The polymer dispersions of this kind may also contain, in quantities ranging from about 3 to 20 percent of the weight of the polymer, nitriles of $\alpha,\beta$-olefinically unsaturated carboxylic acids, such as in particular acrylonitrile, and also, in amounts usually ranging from 0.5 to 10 percent and in particular from 0.5 to 5 percent by weight, olefinically unsaturated monomers having reactive groups, which are often soluble in water, for example $\alpha,\beta$-unsaturated, usually $C_{3-5}$ mono- and dicarboxylic acids, such as acrylic acid, methacrylic acid, crotonic acid, maleic acid, fumaric acid and itaconic acid and their amides which may be substituted by methylol groups at the nitrogen atom or which are substituted by $C_{1-4}$ alkoxymethyl groups, for example acrylamide, methacrylamide, N-methylol acrylamide, maleic amide and maleic imide, hydroxyalkyl acrylates and methacrylates such as glycol monoacrylate and monomethacrylate, butanediol-1,4-monoacrylate and monomethacrylate, monoalkyl esters of $\alpha,\beta$-olefinically unsaturated dicarboxylic acids of the above kinds, such as in particular monoethyl maleate and mono-n-butyl maleate, heterocyclic vinyl compounds such as N-vinyl pyrrolidone and N-vinylimidazole, monomers having a number of isolated double bonds such as divinyl benzene, methylene-bis-acrylamide and diallyl phthalate, and also vinylsulfonic acid and its esters and alkali metal salts, in the form of polymerized units. Polymer dispersions of the above may be summarized as dispersions of vinyl polymers or as dispersions of polymers of olefinically unsaturated monomers or of polymers of monoolefinically unsaturated and possibly also diolefinically unsaturated monomers.

the polymer dispersions may be manufactured with the use of conventional anionic and/or non-ionic emulsifiers and optionally conventional protective colloids. Examples of suitable emulsifying and dispersing agents are alkyl sulfates, such as lauryl sulfate, alkali metal salts of fatty acids, such as sodium stearate and potassium oleate, alkyl sulfonates, ethoxylated alkyl phenols having $C_{8-12}$ alkyl groups and exhibiting from 5 to 30 and in particular from 10 to 25 ethylene oxide radicals, and their sulfonation products and alkoxylated, in particular ethoxylated, fatty alcohols, fatty amines and fatty acids, and possibly, in minor quantities, polyvinyl alcohol, partially saponified vinyl acetate polymers, carboxymethyl cellulose and hydroxyethyl cellulose. The amount of emulsifiers in the polymer dispersions is generally between 0 and 5 percent and preferably between 0.1 and 2 percent by weight, based on the weight of the polymer, the dispersions often containing both anionic and non-ionic emulsifiers. the polymer dispersions having particle diameters of more than 0.2 μu, on average usually contain 0.1 to 1 percent by weight of emulsifier, and polymer dispersions having particle diameters of less than 0.2 μu, on average, usually contain from 1 to 4 percent and in particular from 1 to 2 percent of emulsifier, based on the weight of the polymers.

In our novel process, alkoxylated amines having inverse water solubility are added to the polymer dispersions of the above kind. Thus the water solubility of the alkoxylated amines used as sensitizers is greater at lower temperatures, e.g. room temperature, than at elevated temperatures, e.g. at 50° or 90°C. The alkoxylated amines may be derived from monofunctional or polyfunctional amines generally having from 1 to 10 and preferably from 1 to 3 amino groups. Of particular interest are amines having 2 amino groups. The amino groups in the alkoxylated amines may be primary, secondary or tertiary amino groups. The alkoxylated amines are preferably derived from straight-chain or branched-chain aliphatic amines, particularly polyfunctional straight-chain aliphatic amines such as ethylene diamine, diethylene triamine, dipropylene triamine, triethylene tetramine and tetraethylene pentamine, and also from ethanolamine, diethanolamine and triethanolamine, ethylene diamine being of particular interest. The alkoxy radical of the alkoxylated amines may, in particular, by derived from ethylene oxide and/or propylene oxide. If the alkoxylated amines are derived from ethylene oxide and propylene oxide, the ethylene oxide and propylene oxide may be attached, in the usual way, either randomly or as blocks. We prefer that the alkoxylated amines contain attached propylene oxide or ethylene oxide and propylene oxide when they are derived from alkyl amines containing a total of up to 4 carbon atoms in the molecule. Where the alkoxylated amines are derived from alkyl amines having more than 4 carbons and in particular more than 8 carbons in the molecule, they may contain attached radicals of ethylene oxide alone, propylene oxide alone or ethylene oxide and propylene oxide together.

When the alkoxylated amines contain ethylene oxide and propylene oxide, it has been found advantageous if the amount of attached propylene oxide increases with increasing amounts of amino groups in the amine used as starting material. The molar ratio of ethylene oxide to propylene oxide in such alkoxylated amines is frequently between 1:10 and 1:1 and the mean molecular weight of the alkoxylated amines is generally between about 200 and 15,000 and preferably between 800 and 6,000 (measured by determining the hydroxyl number by the acetic anhydride method). The mean molecular weight of propoxylated amines, containing attached propylene oxide only, is generally between 600 and 1,400. In general, the alkoxylated amines have a turbidity point between about 10° and 70°C in 1% aqueous solution. Particularly interesting alkoxylated amines are those derived from ethylene diamine by the addition fo propylene oxide or of ethylene oxide and propylene oxide in a molar ratio of from 1:1 to 1:5, the ethylene oxide and propylene oxide radicals being distributed randomly or as blocks.

It is surprising that alkoxylated amines of the said kinds are suitable for use as heat-sensitizers for polymer dispersions, since for example copolymers of propylene oxide and ethylene oxide having inverse solubility, when used in comparable amounts, provide no heat-sensitizing activity or at most only slight heat-sensitization with incomplete coagulation.

In our novel process the alkoxylated amines of the above kinds may be added in amounts usually of from 1 to 20 percent and preferably from 2 to 10 percent by weight of the polymers, to the polymer dispersions which generally have a polymer content of from 5 to 60 percent and in particular from 20 to 50 percent by weight, the addition being made at room temperature. The amount of alkoxylated amine necessary in each to achieve the desired heat-sensitizing effect in the various types of dispersion may be readily determined by simple experiment. To achieve heat-sensitization, the pH of the mixture is adjusted to below 6, if the starting polymer dispersion has a pH of 6 or more, this adjustment being carried out immediately or, if desired, after storage. To this end, use may be made of, say, dilute mineral acids such as hydrochloric, sulfuric and phosphoric acids, or organic acids such as acetic acid. Preferably the pH is set to below 4 and in particular at a value between 1 and 3, and in the case of pH between 4 and 6 it has been found advantageous also to add to the mixture electrolytes such as sodium chloride or magnesium chloride in amounts of from about 1 to 3 percent by weight, based on the weight of the polymer. If the starting polymer dispersion has a pH of less than 6 and in particular from 1 to 3, and the alkoxylated amines having inverse solubility are added thereto, acidification is unnecessary. In such cases, it may sometimes be advantageous to add electrolytes or to lower the pH further, for example from 5 to 2, in order to increase the heat-sensitizing effect. In some cases it may even be convenient to add the alkoxylated amines and dilute acids together to polymer dispersions having a pH of 6 or more.

Our novel process for the heat-sensitization of polymer dispersions is particularly distinguished by the fact that coagulation on heating occurs very quickly and completely. Furthermore, the sensitized polymer dispersions are exceptionally stable at room temperature and show no undesirable increase in viscosity, particularly when they have a pH of more than 4. Finally, products which have been prepared from such heat-sensitized polymer dispersions by coagulation of the polymers and further processing show very little tendency to electrostatic charging. Moreover, the polymer dispersions which have been heat-sensitized by the present process are sufficiently stable to shear forces during processing.

The polymer dispersions which have been heat-sensitized by the present process are of particular interest for use as binders in non-woven webs of fibrous material, in the manufacture of coatings and laminates, e.g. on paper, hollow articles — for example hollow articles of glass or plastics materials — and on fabrics, and in the manufacture of foams. The process is generally suitable for thermal coagulation of polymer dispersions.

In the following Examples the parts are by weight.

EXAMPLE 1

To a conventionally produced 20% aqueous dispersion of a copolymer of 60 parts of butadiene, 38 parts of styrene and 2 parts of itaconic acid and containing 0.6 part of sodium lauryl sulfate as emulsifier, there is added, per 100 parts of dispersion, 1 part of a conventionally prepared random polyadduct of 48 moles of propylene oxide and 20 moles of ethylene oxide per mole of ethylene diamine (sensitizer A). 10% aqueous hydrochloric acid is then added until the pH is 2 to give a heat-sensitized polymer dispersion which coagulates completely in a few seconds at 38.4°C.

EXAMPLE 2

To 100 parts of a 20% aqueous dispersion of a copolymer of 84 parts of vinylidene chloride, 10 parts of methyl acrylate and 5 parts of itaconic acid, containing 1.5 parts of the sodium salt of a $C_{12-16}$ alkylaryl sulfonate, there are added 2 parts of sensitizer A, whereupon the pH of the mixture is adjusted to 1.8 by the addition of 5% aqueous sulfuric acid. There is obtained a polymer dispersion which completely coagulates within a few minutes at 73.2°C. The dispersion is suitable, for example, for coating hollow articles.

EXAMPLE 3

To 100 parts of a 20% aqueous dispersion of a copolymer of 50 parts of methyl methacrylate, 20 parts of methyl acrylate, 20 parts of ethyl acrylate and 10 parts of methacrylic acid, containing 0.8 part of the sodium salt of a $C_{12-16}$ alkyl sulfonate and 0.2 part of the sodium salt of a conventionally sulfonated condensate of p-octyl phenol and 20 moles of ethylene oxide as emulsifier, there is added 1 part of sensitizer A, whereupon the pH is adjusted to 1.9 by the addition of 10% aqueous maleic acid. There is obtained a heat-sensitized polymer latex which coagulates virtually completely within a few seconds at 26°C.

EXAMPLE 4

To 100 parts of a 20% (40%) aqueous dispersion of a copolymer of 50 parts of n-butyl acrylate, 48 parts of styrene and 2 parts of methacrylic acid containing 1.5 parts of the sodium salt of a $C_{16-18}$ alkyl sulfonate as emulsifier, there are added 1.6 parts (3.2 parts) of the sensitizer A, whereupon the pH is adjusted to 2 (1.9) by the addition of dilute aqueous hydrochloric acid. There is obtained a polymer dispersion which coagulates virtually completely within a few seconds at 45°C (37.5°C). The sensitized dispersion is suitable as a binder for non-woven fabrics.

EXAMPLE 5

To 100 parts of a conventionally prepared 20% aqueous dispersion of a copolymer of 80 parts of methyl methacrylate, 10 parts of methyl acrylate and 10 parts of methacrylic acid, containing 1.8 parts of $C_{12-16}$ alkylaryl sulfonate as emulsifier, there are added 2 parts of sensitizer A, whereupon the pH is adjusted to 2 by the addition of dilute sulfuric acid. There is obtained a sensitized polymer dispersion which coagulates virtually completely within a few seconds at 38.3°C.

EXAMPLE 6

To 100 parts of a conventionally prepared 20% aqueous dispersion of a copolymer of 47 parts of n-butyl acrylate, 51 parts of vinyl acetate and 2 parts of acrylic acid, containing 2%, based on the polymer, of lauryl sulfate as emulsifier, there are added 1.6 parts of sensitizer A, whereupon the pH is adjusted to 2. There is obtained a sensitized polymer dispersion which coagulates virtually completely within a few seconds at 45°C. The sensitized dispersion is suitable for making coatings, textile finishes and for use as a binder for leather-like non-woven webs.

EXAMPLE 7

To 100 parts of a conventionally prepared 20% aqueous dispersion of a copolymer of 90 parts of n-butyl acrylate, 6 parts of acrylonitrile, 2 parts of acrylamide and 2 parts of methacrylic acid, containing 0.5% w/w, based on the polymer of a conventionally obtained adduct of 25 moles of ethylene oxide and 1 mole p-n-nonyl phenol as emulsifier, there is added 1 part of sensitizer A or 0.7 part of a conventionally prepared reaction product of 79 moles of propylene oxide and 18 moles of ethylene oxide per mole of triethylene tetramine (sensitizer B) or 1 part of a conventionally prepared reaction product of 77 moles of propylene oxide and 16 moles of ethylene oxide per mole of diethylene triamine (sensitizer C) or 0.7 part of a conventionally prepared reaction product of 67 moles of propylene oxide and 37 moles of ethylene oxide per mole of dipropylene triamine (sensitizer D) or 1.4 parts of a conventionally prepared reaction product of 82 moles of propylene oxide and 22 moles of ethylene oxide per mole of tetraethylene pentamine (sensitizer E), whereupon the pH is adjusted to 2 by the addition of dilute hydrochloric acid. To the mixture containing sensitizer D there is added 0.2 part of ammonium chloride, and to the mixtures containing sensitizers C, D and E there is added 0.4 part of ammonium chloride. There are obtained sensitized polymer dispersions which coagulate virtually completely within a few seconds at 45.1°, 53°, 35.8°, 50.9° and 40.2°C respectively. The sensitized dispersions are suitable, for example, for the manufacture of adhesive coatings.

EXAMPLE 8

To 100 parts of a mixture of equal parts of 20% aqueous dispersions of (a) a copolymer of 45 parts of n-butyl acrylate, 53 parts of styrene and 2 parts of itaconic acid and (b) a copolymer of 62 parts of butadiene, 35 parts of styrene and 3 parts of fumaric acid, which dispersions contain 1.5 and 0.7% by weight of the weight of the polymer respectively of sodium lauryl sulfate as emulsifier, there is added 1 part of sensitizer A. The pH is then adjusted to 2 and there is obtained a sensitized polymer dispersion which coagulates virtually completely within a few seconds at 41.5°C.

EXAMPLE 9

To 100 parts of a conventionally prepared 20% aqueous dispersion of a copolymer of 90 parts of n-butyl acrylate, 6 parts of acrylonitrile, 2 parts of acrylamide and 2 parts of methacrylic acid, containing 0.5% by weight of the weight of polymer of sodium dodecyl sulfonate as emulsifier, there is added 5%, based on the amount of polymer in the dispersion, of sensitizer F and 3%, based on the amount of polymer in the dispersion, of maleic acid and 0.1 or 0.6 or 1.1% of sodium dodecyl sulfonate. There are obtained heat-sensitive dispersions having coagulation temperatures of 54.5°, 51.2° and 56.4°C respectively and pH's of from 2 to 2.5.

The average particle size of the polymer dispersion is 162 $\mu$m. The sensitizer F is a reaction product of triethanol amine with 20.2 moles of propylene oxide and its turbidity point

EXAMPLE 10

To 100 parts of the 20% aqueous dispersion described in Example 9 there are added 5%, based on the amount of polymer in the dispersion, of sensitizer G and also 2%, based on the amount of polymer in the dispersion, of maleic acid and 0.2 or 1.5% by weight, based on said polymer, of sodium dodecyl-sulfonate. There are obtained heat-sensitive dispersions having coagulation temperatures of 39.6° and 42.6°C respectively.

The sensitizer G is a conventionally prepared reaction product of ethylene diamine with 14.2 moles of propylene oxide, this propoxylated amine having a turbidity point of 53°C in 1% aqueous solution.

EXAMPLE 11

To 100 parts of an aqueous dispersion as described in Example 9 there are added 2% by weight, based on the amount of polymer in the dispersion, of maleic acid and from 5 to 4 percent by weight, based on the amount of polymer in the dispersion, of sensitizer H. There are obtained heat-sensitized polymer dispersions having coagulation temperatures of 43° to 47.5°C respectively. Their pH is 2.5 and 2.2 respectively.

The sensitizer H is a conventionally prepared reaction product of ethylene diamine and 12 moles of propylene oxide and has a turbidity point of 65°C in 1% aqueous solution.

EXAMPLE 12

To 100 parts of a conventionally prepared 20% aqueous dispersion of a copolymer of 69 parts of butadiene, 30 parts of acrylonitrile and 1 part of N-methylol methacrylamide, containing containing 1.5 parts of sodium lauryl sulfate as emulsifier, there are added 5% by weight, based on the amount of polymer, of sensitizer H and 2 parts of maleic acid. There is obtained a heat-sensitive polymer dispersion having a pH of 3.6 and a coagulation temperature of 42.5°C. The sensitized dispersion is suitable for binding needle-punched non-woven webs serving, for example, as starting materials for the manufacture of leather substitutes.

EXAMPLE 13

To 100 parts of a conventionally prepared 20% aqueous dispersion of a copolymer of 50 parts of n-butyl acrylate, 48 parts of styrene and 2 parts of acrylic acid, containing 1.5 parts of alkylaryl sulfonate as emulsifier, there are added 5% by weight, based on the amount of polymer, of the sensitizer F and 2 parts of maleic acid. There is obtained a heat-sensitized dispersion having a pH of 4 and a coagulation temperature of 49.6°C.

EXAMPLE 14

To 100 parts of a conventionally prepared 20% aqueous dispersion of a copolymer of 47 parts of n-butyl acrylate, 51 parts of vinyl acetate and 2 parts of acrylic acid, containing 2%, based on the polymer, of the addition product of the sodium salt of the sulfuric acid mono-ester of HD-Ocenol Sp 60/65 (mixture of saturated and unsaturated fatty alcohols) with 25 moles of ethylene oxide, as emulsifiers, there are added 5% by weight, based on the weight of polymer, of sensitizer H and 1 part of oxalic acid. There is obtained a heat-sensitized polymer dispersion having a pH of 3 and coagulation temperature of 37.4°C.

EXAMPLE 15

To 100 parts of a conventionally prepared 30% aqueous dispersion of a copolymer of 96 parts of n-butyl acrylate and 3 parts of N-methylol methacrylamide and 1 part of divinyl benzene, containing 1 part of the sodium salt of a $C_{14-16}$ alkyl sulfonate as emulsifier and havving a pH of 4.3, there is added, at room temperature, 1 part of a conventionally obtained polyadduct of 25 moles of propylene oxide and 5 moles of ethylene oxide per mole of ethylene diamine. The heat-sensitized mixture has a pH of 4.5 and coagulates completely within a few seconds when heated to 63°C.

EXAMPLE 16

To a conventionally prepared 35% aqueous dispersion of a copolymer of 87 parts of n-butyl acrylate, 10 parts of acrylonitrile, 2 parts of N-butoxymethyl methacrylamide and 1 part of acrylic acid, containing 0.8 part of the sodium salt of a $C_{12-14}$ alkylaryl sulfonate and 0.5 part of sodium pyrophosphate and having a pH of 4, there is added 0.7 parts of a polyadduct of 25 moles of propylene oxide and 6 moles of ethylene oxide per mole of ethylene diamine. The resulting mixture has a pH of 4.3 and coagulates completely within a few seconds when heated to 52°C. This dispersion is suitable for use as a binder in nonwoven webs.

EXAMPLE 17

To 100 parts of a 30% aqueous dispersion of a conventionally prepared copolymer of 50 parts of styrene and 50 parts of n-butyl acrylate, containing 0.8 part of the sodium salt of lauryl sulfonate and 0.3 part of a $C_{12-16}$ fatty acid amido N-n-propylbetaine mixture

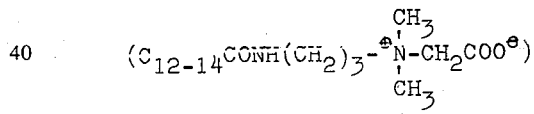

as emulsifier and having a pH of 2.6, there are added, at room temperature, 1.2 parts of a polyadduct of 20 moles of propylene oxide and 5 moles of ethylene oxide per mole of ethylene diamine.

The resulting mixture has a pH of 3 and coagulates quickly and completely when heated to 68°C. The mixture is readily foamable and is suitable for use in foamed form for foamimpregnating non-woven fabrics, in which case it coagulates when heated immediately after impregnation to at least 68°C to stiffen to non-woven fabric whilst showing virtually no migration of the binder polymer.

EXAMPLE 18

To 100 parts of a 20% aqueous dispersion of a conventionally prepared copolymer of 97 parts of n-butyl acrylate, 2 parts of N-methylol methacrylamide and 1 part of methacrylic acid, containing 0.6 part of the ethoxylation product of a $C_{8-12}$ alkyl phenol with 10 moles of ethylene oxide, as emulsifier, and having a pH of 2, there is added 1 part of the polyadduct of 20 moles of propylene oxide and 5 moles of ethylene oxide per mole of ethylene diamine. The heat-sensitized mixture has a pH of 2.2 and coagulates rapidly and completely when heated to 46°C. The sensitized dispersion is suitable, for example, for use as a binder in nonwoven fabrics of natural and/or synthetic fibers.

EXAMPLE 19

To 100 parts of a conventionally prepared 20% aqueous dispersion of a copolymer of 60 parts of butadiene, 38 parts of styrene and 2 parts of itaconic acid, containing 0.6 part of sodium lauryl sulfonate as emulsifier and having a pH of 1.8, there is added 1 part of a conventionally produced random polyadduct of 48 moles of propylene oxide and 20 moles of ethylene oxide per mole of ethylene diamine. The resulting mixture has a pH of 2 and coagulates complteley within a few minutes when heated to 38.4°C.

EXAMPLE 20

To a conventionally prepared 30% aqueous polystyrene dispersion containing 1 part of the sodium salt of lauryl sulfonate as emulsifier, there is added 0.9% of a conventionally prepared polyadduct of 25 moles of propylene oxide and 5 moles of ethylene oxide per mole of ethylene diamine, referred to below as sensitizer I. This heat-sensitized dispersions has a pH of 2.5 and coagulates rapidly and completely when heated to 35°C.

EXAMPLE 21

To a conventionally manufactured aqueous dispersion of a copolymer of 67 parts of styrene, 30 parts of methyl acrylate and 3 parts of acrylic acid, containing 2 parts of a sodium salt of the sulfonated ethoxylation product of a $C_{12-16}$ alkanol with 5 moles of ethylene oxide, as emulsifier, there is added, per 100 parts of dispersion, a. for a dispersion having a 20% solids content:
  1. 0.6 part of sensitizer I (the resulting mixture has a pH of 1.8 and coagulates completely within a few minutes on heating to 50°C);
  2. 0.8 part of sensitizer I (the resulting mixture has a pH of 2 and coagulates completely within a few seconds when heated to 40°C);
b. for a dispersion having a solids content of 30%:
  1. 1.2 parts of sensitizer I (the resulting mixture has a pH of 2 and coagulates completely within a few seconds when heated to 34°C);
  2. 1.5 parts of sensitizer I (the resulting mixture has a pH of 2 and coagulates completely within a few seconds on heating to 30°C).

EXAMPLE 22

To a 20% commercial natural rubber dispersion mixed with 5% by weight (based on the solids content) of the sodium salt of lauryl sulfonate to provide sufficient stability, there is added, at a pH of 1.8, 1 part of sensitizer I for every 100 parts of said natural latex. On heating to 38°C this latex coagulates completely. A natural latex post-stabilized with lauroyl sulfonate only shows no change on heating.

EXAMPLE 23

To a conventionally prepared secondary dispersion of polyethylene containing 20 parts of polyethylene, 4 parts of the ethoxylation product of 1 mole of n-nonyl phenol and 10 moles of ethylene oxide and 1 part of the sodium salt of the sulfonated ethoxylation product of 1 mole of n-nonyl phenol with 25 moles of ethylene oxide and having a pH of 2, there is added 0.5 part of sensitizer I for every 100 parts of dispersion. This heat-sensitized secondary dispersion coagulates rapidly and completely on heating to a temperature of 62°C. The sensitized dispersion is suitable, for example, for coating knitted and woven fabrics.

EXAMPLE 24

To a commercial secondary dispersion of polyisobutylene having a molecular weight, as measured by the method proposed by Ueberreiter in Makromolekulare Chemie, Vol. 8 (1952) pp. 21–28, of 100,000 to 200,000 and containing a protective colloid based on a vinyl pyrrolidone polymer and also 1% (based on the solids content) of sodium lauryl sulfonate as emulsifier and having a pH of 1.2 at a solids content of 20%, there is added 0.6 part of sensitizer I for every 100 parts of dispersion. This heatsensitized secondary dispersion coagulates completely on heating to 42°C.

EXAMPLE 25

To a conventionally prepared polyvinyl chloride dispersion containing 2.5% (based on the solids content) of sodium lauryl sulfate as emulsifier, there are added 1.5 parts of sensitizer I for every 100 parts of dispersion. The heat-sensitized polymer dispersion has a pH of 1.8 at a solids content of 30% and coagulates completely within a few seconds on heating to a temperature of 44°C.

EXAMPLE 26

To a conventionally prepared 30% aqueous polyvinyl chloride dispersion containing 2.5% (based on the solids content) of sodium lauryl sulfate, there are added 1.5 parts of a polyadduct of 21 moles of propylene oxide per mole of triethanol amine for every 100 parts of dispersion. The heat-sensitized mixture has a pH of 1.8 and coagulates within a few seconds on heating to 44.7°C.

EXAMPLE 27

To a conventionally prepared 30% aqueous dispersion of a copolymer of 98 parts of vinyl acetate and 2 parts of acrylic acid, containing 1.2% (based on the solids content) of the condensation product of p-octyl phenol and 20 moles of ethylene oxide and also containing 1.2 parts of the sodium salt of a conventionally sulfonated condensation product of p-octyl phenol and 20 moles of ethylene oxide, as emulsifier, there are added 1.8 parts of a conventionally prepared polyadduct of 25 moles of propylene oxide and 5 moles of ethylene oxide per mole of ethylene diamine, for every 100 parts of dispersion. This heat-sensitized dispersion has a pH of 1.8 and coagulates rapidly and completely on heating to 72°C.

We claim:

1. In a process for the heat-sensitization of an anionic or nonionic aqueous polymer dispersion having a polymer content of from 5 to 60 percent by weight and containing 0.1 to 2 percent by weight, based on the polymer, of an anionic or nonionic emulsifier, in which a polyalkylene oxide compound having inverse solubility is added, as a sensitizer, to the polymer dispersion after its manufacture, the improvement which comprises adding to said polymer dispersion, as the heat sensitizer therefor, in an amount of from 2 to 10 percent by weight, based on the polymer, a polyalkoxylated aliphatic amine containing from 1 to 10 amino groups and alkoxylated with an alkylene oxide selected from the group consisting of ethylene oxide, propylene oxide, and both oxides, said polyalkoxylated amine having a mean molecular weight of from 200 to 15,000, as measured by the hydroxyl number determined by the acetic anhydride method, and adjusting the pH of the mixture to below 6 if it is not already below 6.

2. A process as claimed in claim 1, wherein said alkoxylated amine is a polyoxypropylated aliphatic amine having 1–4 carbon atoms and 1–3 amino groups, said polyoxypropylated amine having a mean molecular weight of from 800 to 6,000, as measured aforesaid.

3. A process as claimed in claim 1, wherein said alkoxylated amine is an aliphatic amine with 1 to 4 carbon atoms and 1 to 3 amino groups and the oxyalkylene groups thereof are those of both ethylene oxide and propylene oxide in a molar ratio between 1:10 and 1:1, respectively, said polyalkoxylated amine having a mean molecular weight of from 800 to 6000 as measured aforesaid.

4. A process as claimed in claim 1, wherein said aliphatic amine has more than 4 carbon atoms and 1–3 amino groups.

5. A process as claimed in claim 1, and thereafter heating said mixture to a temperature sufficient to cause said polymer dispersion to coagulate.

6. A process as claimed in claim 1, wherein said alkoxylated amine is ethylene diamine, diethylene triamine, triethylene tetramine, tetraethylene pentamine or dipropylene triamine which is oxyalkylated with both ethylene oxide and propylene oxide in a mol ratio of said oxides of 1:10 to 1:1, respectively.

7. A process as claimed in claim 1, wherein said alkoxylated amine is polyoxypropylated triethanolamine, diethanolamine, or ethanolamine.

8. A process as claimed in claim 1, wherein said alkoxylated amine is polyoxypropylated ethylene diamine.

9. A process as claimed in claim 1, wherein said oxyalkylated amine is ethylene diamine which is oxyalkylated with both ethylene oxide and propylene oxide in a mol ratio of said oxides of 1:10 to 1:1, respectively.

* * * * *

UNITED STATES PATENT AND TRADEMARK OFFICE
CERTIFICATE OF CORRECTION

PATENT NO. : 3,878,152
DATED : April 15, 1975
INVENTOR(S) : Dieter Distler et al It is certified that error appears in the above-identified patent and that said Letters Patent are hereby corrected as shown below:

In the Heading, insert -- [30] Foreign Application Priority Data   May 30, 1972   Germany   P 22 26 269.7
December 29, 1972   Germany   P 22 63 921.0
February 10, 1973   Germany   P 23 06 541.0 --

Signed and Sealed this

Twenty-eighth Day of September 1976

[SEAL]

Attest:

RUTH C. MASON
*Attesting Officer*

C. MARSHALL DANN
*Commissioner of Patents and Trademarks*